United States Patent
Sakurai et al.

(10) Patent No.: US 8,531,505 B2
(45) Date of Patent: Sep. 10, 2013

(54) IMAGING PARAMETER ACQUISITION APPARATUS, IMAGING PARAMETER ACQUISITION METHOD AND STORAGE MEDIUM

(75) Inventors: Keiichi Sakurai, Akishima (JP); Mitsuyasu Nakajima, Nishitamagun Mizuho-machi (JP); Takashi Yamaya, Fussa (JP); Yuki Yoshihama, Inagi (JP)

(73) Assignee: Casio Computer Co., Ltd., Tokyo (JP)

( * ) Notice: Subject to any disclaimer, the term of this patent is extended or adjusted under 35 U.S.C. 154(b) by 70 days.

(21) Appl. No.: 13/338,696

(22) Filed: Dec. 28, 2011

(65) Prior Publication Data

US 2012/0162387 A1 Jun. 28, 2012

(30) Foreign Application Priority Data

Dec. 28, 2010 (JP) ................... 2010-294258

(51) Int. Cl.
*H04N 13/02* (2006.01)
(52) U.S. Cl.
USPC .......................................................... 348/47
(58) Field of Classification Search
USPC .......................................................... 348/47
IPC ................................................... H04N 13/02
See application file for complete search history.

(56) References Cited

U.S. PATENT DOCUMENTS

| 7,538,876 B2 * | 5/2009 | Hewitt et al. ................. 356/364 |
| 7,834,944 B2 * | 11/2010 | Otte et al. ....................... 349/15 |
| 2011/0199491 A1 | 8/2011 | Jikihira et al. |

FOREIGN PATENT DOCUMENTS

| JP | 05-303629 A | 11/1993 |
| JP | 2003-078925 A | 3/2003 |
| JP | 2004-235934 A | 8/2004 |
| JP | 2008-154195 A | 7/2008 |
| JP | 2010-197198 A | 9/2010 |
| WO | WO 2010/050412 A1 | 5/2010 |

OTHER PUBLICATIONS

Japanese Office Action dated Apr. 24, 2012 (and English translation thereof) in counterpart Japanese Application No. 2010-294258.

* cited by examiner

*Primary Examiner* — Tung Vo
(74) *Attorney, Agent, or Firm* — Holtz, Holtz, Goodman & Chick, PC

(57) ABSTRACT

A server sends to a client a message instructing movement of a display apparatus so that cameras comprising a view for creating a three-dimensional model can shoot a screen of a display apparatus. After movement is complete, the server causes an imaging parameter computation pattern image to be displayed on the screen of the display apparatus and instructs the client to cause the displayed pattern image to be shot by cameras. The server acquires images shot by the cameras from the client and seeks imaging parameters of the cameras on the basis of the pattern image included in the acquired images.

7 Claims, 17 Drawing Sheets

FIG.7A

REGISTRATION REQUEST DATA

| COMMAND IDENTIFIER | CAMERA ID (CAMERA 11A) | BASIC ATTRIBUTES (CAMERA 11A) | CAMERA ID (CAMERA 11B) | BASIC ATTRIBUTES (CAMERA 11B) | ... | VIEW INFORMATION |

FIG.7B

REGISTRATION RESPONSE DATA

| COMMAND IDENTIFIER | CLIENT ID | PASSWORD |

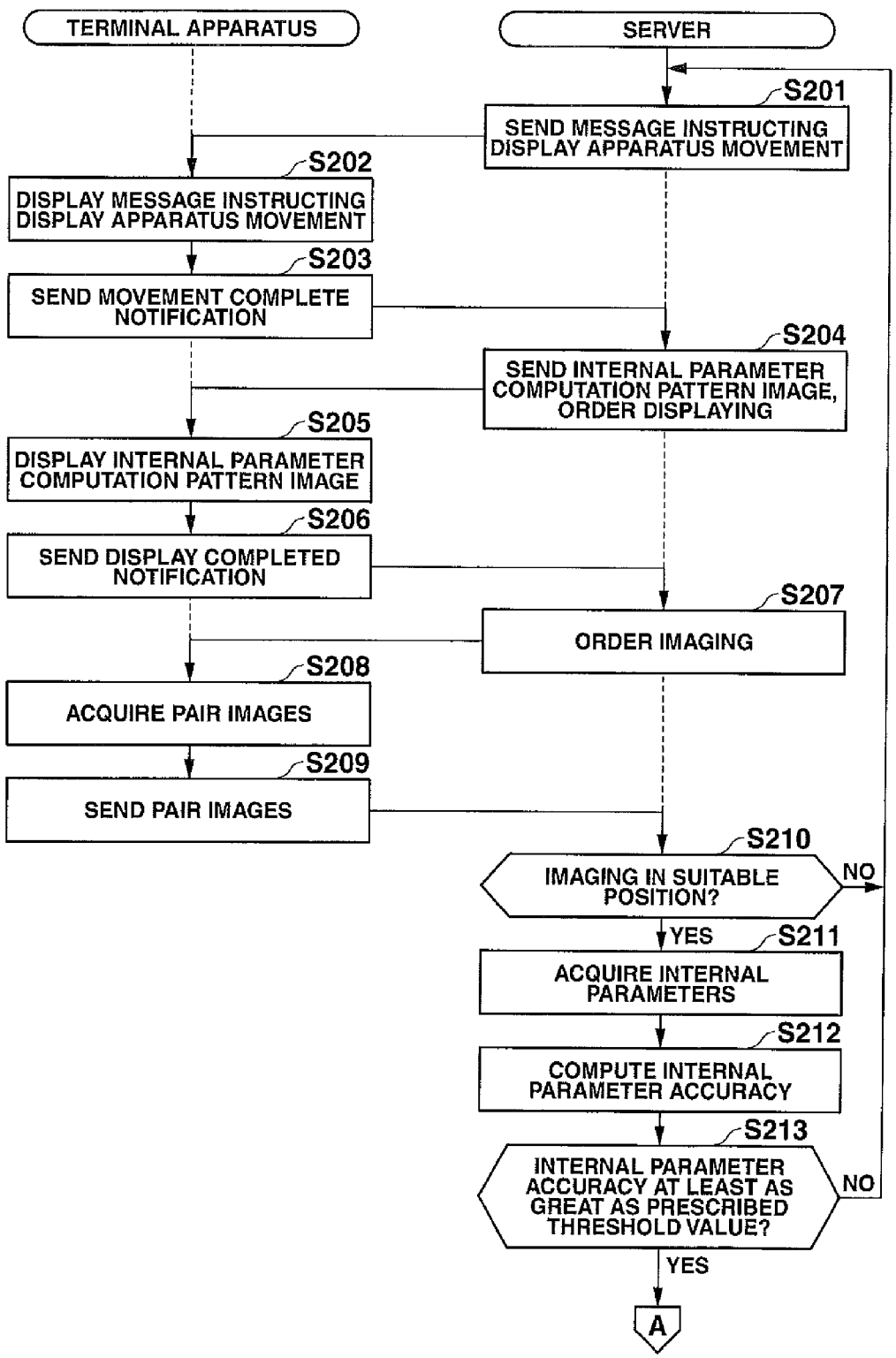

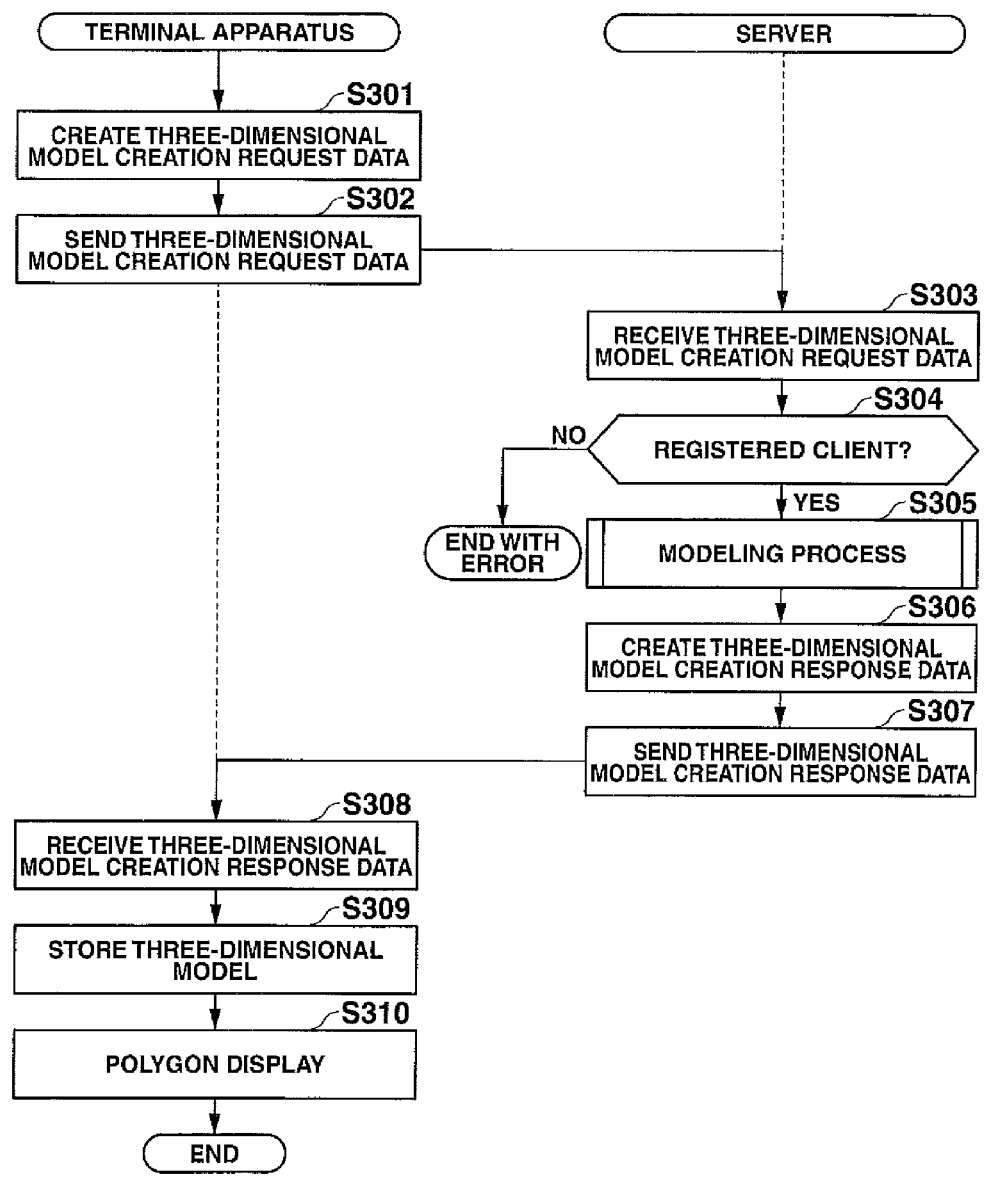

FIG. 13A THREE-DIMENSIONAL MODEL CREATION REQUEST DATA

| COMMAND IDENTIFIER | CLIENT ID | PASSWORD | REQUEST ID | CAMERA ID (CAMERA 11A) | IMAGE DATA (IMAGE A) | CAMERA ID (CAMERA 11B) | IMAGE DATA (IMAGE B) |
|---|---|---|---|---|---|---|---|

FIG. 13B THREE-DIMENSIONAL MODEL CREATION RESPONSE DATA

| COMMAND IDENTIFIER | POLYGON ID | RESPONSE ID | THREE-DIMENSIONAL MODEL |
|---|---|---|---|

FIG. 13C THREE-DIMENSIONAL MODEL CREATION REQUEST DATA (WHEN STREAMING IMAGES)

| COMMAND IDENTIFIER | CLIENT ID | PASSWORD | CAMERA ID (CAMERA 11A) | FRAME NUMBER (IMAGE A) | CAMERA ID (CAMERA 11B) | FRAME NUMBER (IMAGE B) |
|---|---|---|---|---|---|---|

FIG.16A

THREE-DIMENSIONAL MODEL SYNTHESIS REQUEST DATA

| COMMAND IDENTIFIER | CLIENT ID | PASSWORD | REQUEST ID | POLYGON ID | POLYGON ID | ... |

FIG.16B

THREE-DIMENSIONAL MODEL SYNTHESIS RESPONSE DATA

| COMMAND IDENTIFIER | RESPONSE ID | POLYGON ID | THREE-DIMENSIONAL MODEL |

# IMAGING PARAMETER ACQUISITION APPARATUS, IMAGING PARAMETER ACQUISITION METHOD AND STORAGE MEDIUM

CROSS-REFERENCE TO RELATED APPLICATION

This application claims the benefit of Japanese Patent Application 2010-294258, filed Dec. 28, 2010, the entire disclosure of which is incorporated by reference herein.

FIELD

This application relates generally to an imaging parameter acquisition apparatus for acquiring photography parameters of an imaging apparatus, an imaging parameter acquisition method, and a computer-readable storage medium for storing programs.

BACKGROUND

When creating a three-dimensional model from pair images that captured (shot) a common subject from differing directions, it is necessary to acquire imaging parameters for each camera that captured those pair images. As the method for acquiring these imaging parameters, technology is known that causes a calibration board having a parameter computation pattern to be captured by a camera and computes the imaging parameters of the camera from the captured image. However, it is necessary to prepare a special calibration board and position such in front of the camera whose parameters are to be computed, which is troublesome to a user.

SUMMARY

The imaging parameter acquisition apparatus according to a first aspect of the present invention is an imaging parameter acquisition apparatus connected via a network to a client system equipped with a display apparatus and imaging apparatuses, said imaging parameter acquisition apparatus comprising:

a movement instruction unit that sends a moving instruction message to the client system, the moving instruction message instructs to move the display apparatus so that each of the imaging apparatuses, which acquire an image for creating a three-dimensional model, can shoot a screen of the display apparatus;

a display instruction unit that sends a display instruction message to the client system to which the moving instruction message is sent, the display instruction message instructs to display a pattern image for imaging parameter computation on the screen of the display apparatus;

an imaging instruction unit that sends a imaging instruction message to the client system to which the display instruction message is sent, the imaging instruction message instructs (a) to make the imaging apparatuses shooting the screen of the display apparatus and (b) to send the images shot by the imaging apparatuses;

an image acquisition unit that acquires the images which are send by the client system in response to the imaging instruction message; and an imaging parameter acquisition unit that acquires imaging parameters of each of the imaging apparatuses, which acquire the image for creating the three-dimensional model, based on the images acquired by the image acquisition unit.

The imaging parameter acquisition method according to a second aspect of the present invention is an imaging parameter acquisition method using a computer connected via a network to a client system equipped with a display apparatus and imaging apparatuses, the method comprising:

sending a moving instruction message to the client system, the moving instruction message instructs to move the display apparatus so that each of the imaging apparatuses, which acquire an image for creating a three-dimensional model, can shoot a screen of the display apparatus;

sending a display instruction message to the client system to which the moving instruction message is sent, the display instruction message instructs to display a pattern image for imaging parameter computation on the screen of the display apparatus;

sending a imaging instruction message to the client system to which the display instruction message is sent, the imaging instruction message instructs (a) to make the imaging apparatuses shooting the screen of the display apparatus and (b) to send the images shot by the imaging apparatuses;

acquiring the images which are send by the client system in response to the imaging instruction message; and acquiring imaging parameters of each of the imaging apparatuses, which acquire the image for creating the three-dimensional model, based on the acquired images.

The non-transitory computer-readable storage medium according to a third aspect of the present invention is a non-transitory computer-readable storage medium with an executable program stored thereon, wherein the program instructs a computer connected via a network to a client system equipped with a display apparatus and imaging apparatuses to perform the following step:

sending a moving instruction message to the client system, the moving instruction message instructs to move the display apparatus so that each of the imaging apparatuses, which acquire an image for creating a three-dimensional model, can shoot a screen of the display apparatus;

sending a display instruction message to the client system to which the moving instruction message is sent, the display instruction message instructs to display a pattern image for imaging parameter computation on the screen of the display apparatus;

sending a imaging instruction message to the client system to which the display instruction message is sent, the imaging instruction message instructs (a) to make the imaging apparatuses shooting the screen of the display apparatus and (b) to send the images shot by the imaging apparatuses;

acquiring the images which are send by the client system in response to the imaging instruction message; and acquiring imaging parameters of each of the imaging apparatuses, which acquire the image for creating the three-dimensional model, based on the acquired images.

BRIEF DESCRIPTION OF THE DRAWINGS

A more complete understanding of this application can be obtained when the following detailed description is considered in conjunction with the following drawings, in which:

FIG. 7A is a drawing showing an example of the composition of registration request data;

FIG. 7B is a drawing showing an example of the composition of registration response data;

FIG. 8 is a flowchart used to explain the parameter acquisition process;

FIG. 12 is a flowchart used to explain the three-dimensional model creation process;

FIG. 13A is a drawing showing an example of the composition of three-dimensional model creation request data;

FIG. 13B is a drawing showing an example of the composition of three-dimensional model creation response data;

FIG. 13C is a drawing showing an example of three-dimensional model creation request data when the image is streamed;

FIG. 16A is a drawing showing an example of the composition of the three-dimensional model synthesis request data;

FIG. 16B is a drawing showing an example of the composition of the three-dimensional model synthesis response data.

DETAILED DESCRIPTION

Figure 1:
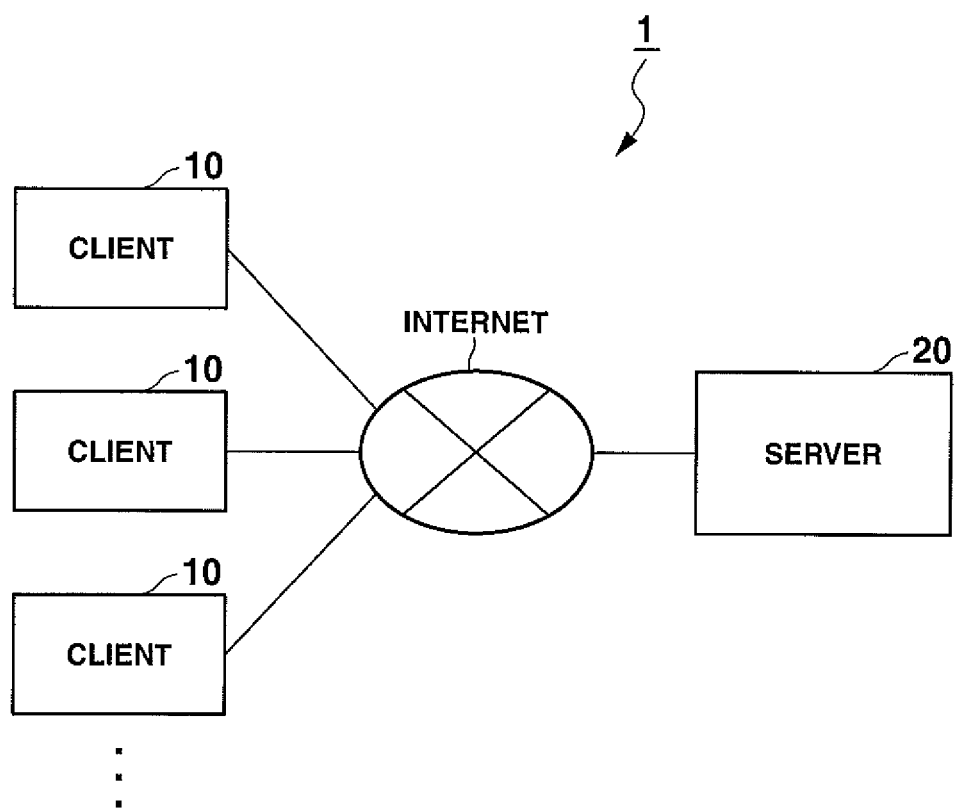
FIG. 1 is a drawing showing the composition of a three-dimensional model creation system according to an embodiment of the present invention.

Below, the preferred embodiments of the present invention are described in detail with reference to the drawings. Identical or corresponding components in the drawings are labeled with the same symbols.

A three-dimensional model creation system 1 according to an embodiment of the present invention will be described. As shown in FIG. 1, the three-dimensional model creation system 1 is provided with multiple client systems 10 (hereafter, referred to simply as clients 10) and a server 20. The clients 10 and server 20 are connected via the Internet so as to be capable of intercommunication.

Figure 2:
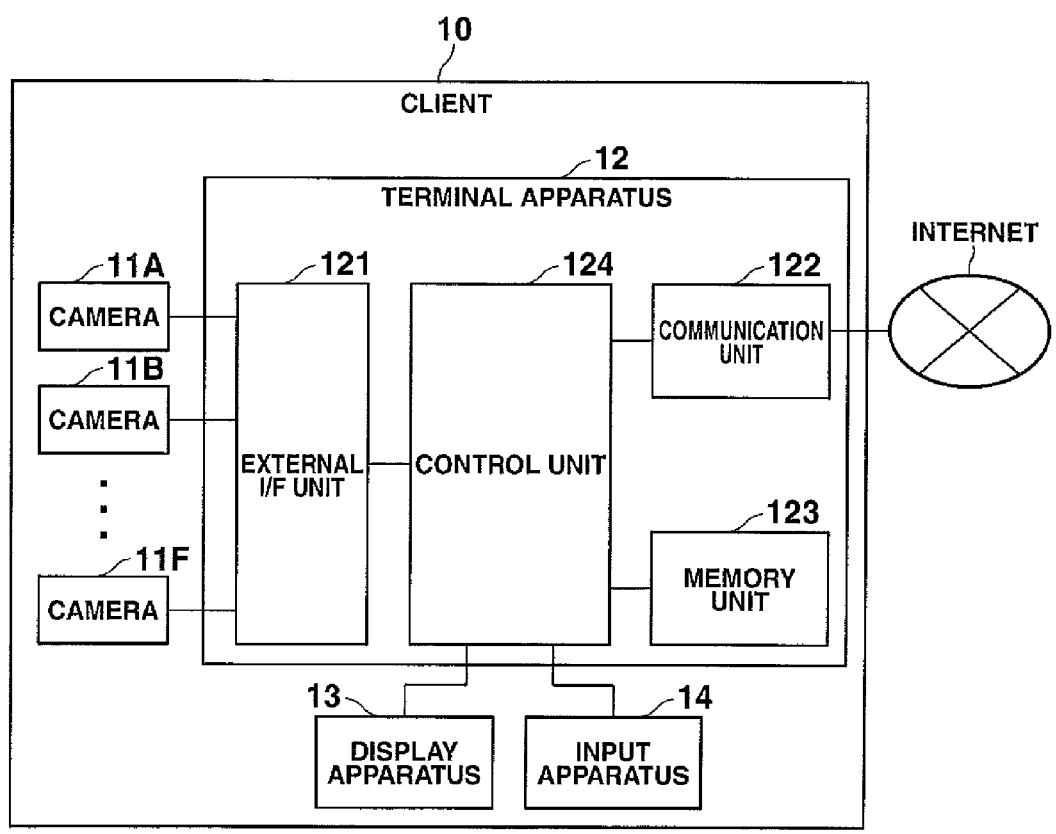
FIG. 2 is a drawing showing the composition of a client system.

The clients 10 are each provided with multiple cameras 11A to 11F, a terminal apparatus 12, a display apparatus 13 and an input apparatus 14, as shown in FIG. 2.

The cameras 11A to 11F are each provided with a lens, an aperture mechanism, a shutter mechanism, and a CCD (charge coupled device) and the like. The cameras 11A to 11F each capture (shoot) the subject and send the captured image data to the terminal apparatus 12. A camera ID that can be identified in the clients 10 is set in each of the cameras 11A to 11F.

When the cameras 11A to 11F are not differentiated, reference is made simply to a camera 11. In addition, when necessary, images captured by the cameras 11A to 11F are described as image A through image F. The number of cameras is not limited to six, and may be an arbitrary number two or larger.

Figure 3:
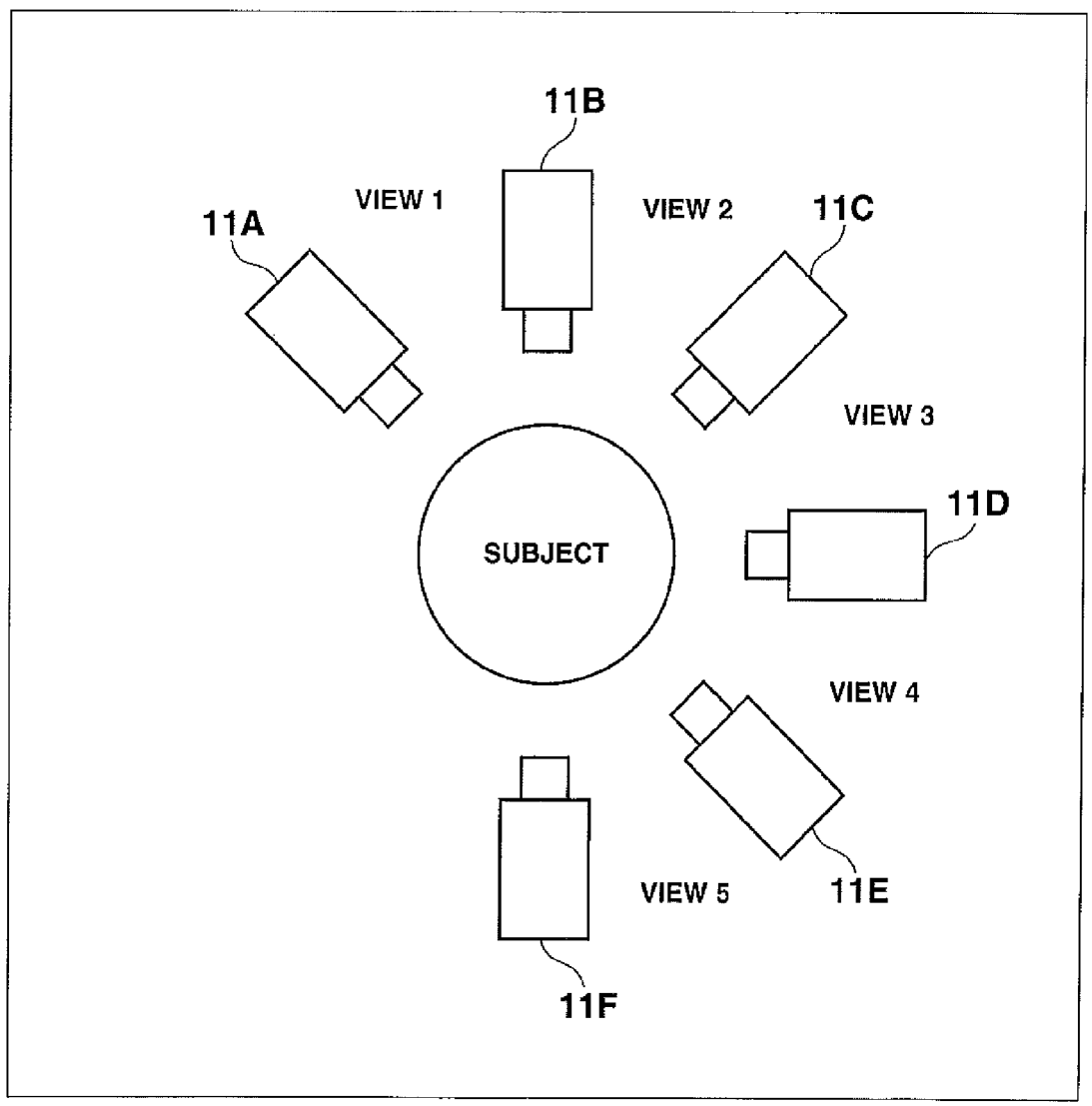
FIG. 3 is a drawing showing the positional relationship between the subject and the various cameras.

Next, the positioning of the cameras 11 will be explained. The cameras 11A to 11F are each positioned so as to surround the subject, as shown in FIG. 3. Accordingly, the cameras 11A to 11F can each capture the subject from a different direction. The cameras 11 are preferably fixed to the floor or a stage so as to not be easily moved.

Returning to FIG. 2, the terminal apparatus 12 is a computer such as a PC (personal computer) or the like. The terminal apparatus 12 is provided with an external I/F (interface) 121, a communications unit 122, a memory unit 123 and a control unit 124.

The external I/F 121 is an interface for connecting to the various cameras 11. The external I/F 121 is composed of a connector conforming to a standard such as USB (Universal Serial Bus), IEEE 1394 or the like, or a camera-connecting board inserted into an expansion slot.

The communications unit 122 is provided with a NIC (Network Interface Card) or the like, and accomplishes sending and receiving of information with the server via a network based on instructions from the control unit 124.

The memory unit 123 is composed of a RAM (Random Access Memory), ROM (Read Only Memory), hard disk device or the like, and stores various types of information, image data capture by the cameras 11 and programs the control unit 124 executes. In addition, the memory unit 123 functions as a work area where the control unit 124 executes processes. In addition, the memory unit 123 stores three-dimensional models (polygon information) sent from the server 20.

The control unit 124 is provided with a CPU (Central Processing Unit) or the like and controls the various parts of the terminal apparatus 12 by executing programs stored in the memory unit 123. In addition, the control unit 124 requests that the server 20 create a three-dimensional model from images captured by the cameras 11, and causes the three-dimensional model received from the server 20 to be displayed on the display apparatus 13. In addition, the control unit 124 requests that the server 20 synthesize multiple three-dimensional models, and causes the synthesized three-dimensional models received from the server 20 to be displayed on the display apparatus 13. Details of processes accomplished by the control unit 124 are described below.

The display apparatus 13 is a PC monitor or the like and displays various types of information on the basis of instructions from the control unit 124. For example, the display apparatus 13 displays three-dimensional models received from the server 20.

The input apparatus 14 is composed of a keyboard and a mouse and the like, creates input signals in accordance with operation by a user and supplies such to the control unit 124.

Figure 4A:
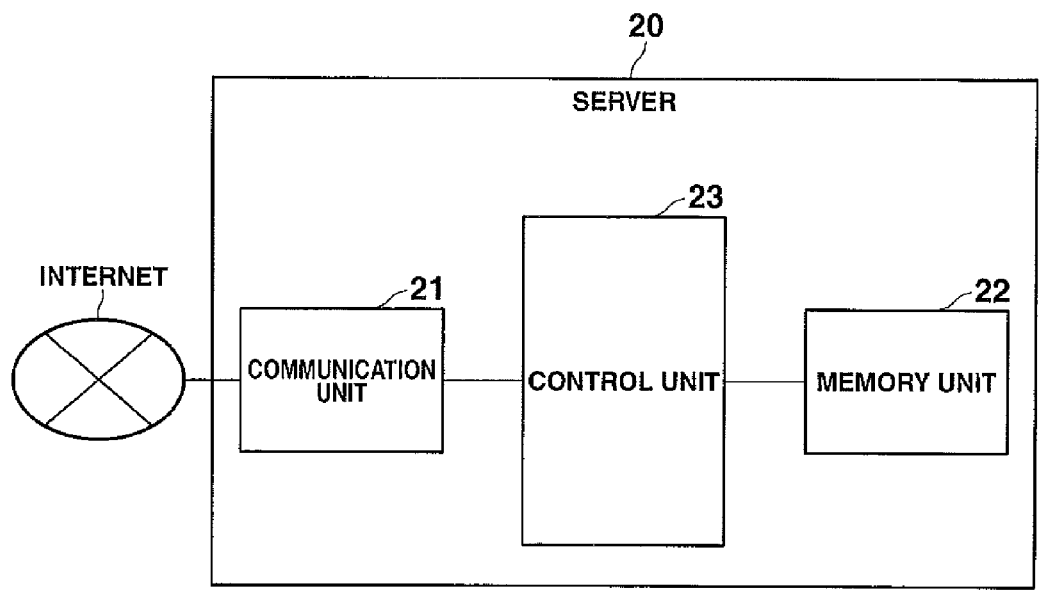
FIG. 4A is a drawing showing the composition of the server.

Next, the server 20 will be explained. The server 20 has functions for creating three-dimensional models from image data received from the terminal apparatus 12 and for synthesizing multiple three-dimensional models. The server 20 is provided with a communications unit 21, a memory unit 22 and a control unit 23, as shown in FIG. 4A.

The communications unit 21 is provided with a NIC (Network Interface Card) or the like and sends and receives information to the terminal apparatus 12 via the Internet.

Figure 4B:
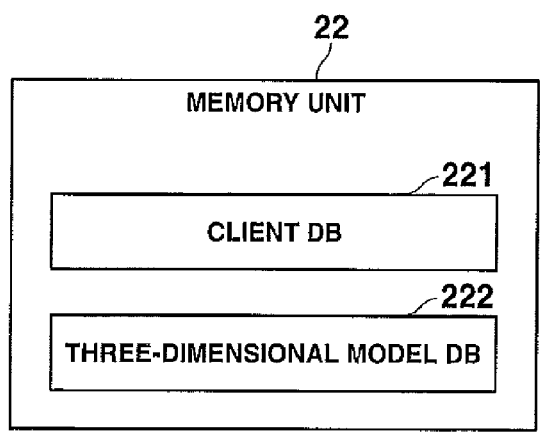
FIG. 4B is a drawing showing the composition of the memory unit of the server in FIG. 4A.

The memory unit 22 is composed of a hard disk apparatus or the like and stores various information and programs that the control unit 23 executes. In addition, the memory unit 22 functions as a work area where the control unit 23 executes processes. In addition, the memory unit 22 stores pattern images that are displayed on the display apparatus 13 of the client 10 for imaging parameter computations of the cameras 11. In addition, the memory unit 22 is composed of a client DB (database) 221 and a three-dimensional model DB 222, as shown in FIG. 4B.

Figure 5:
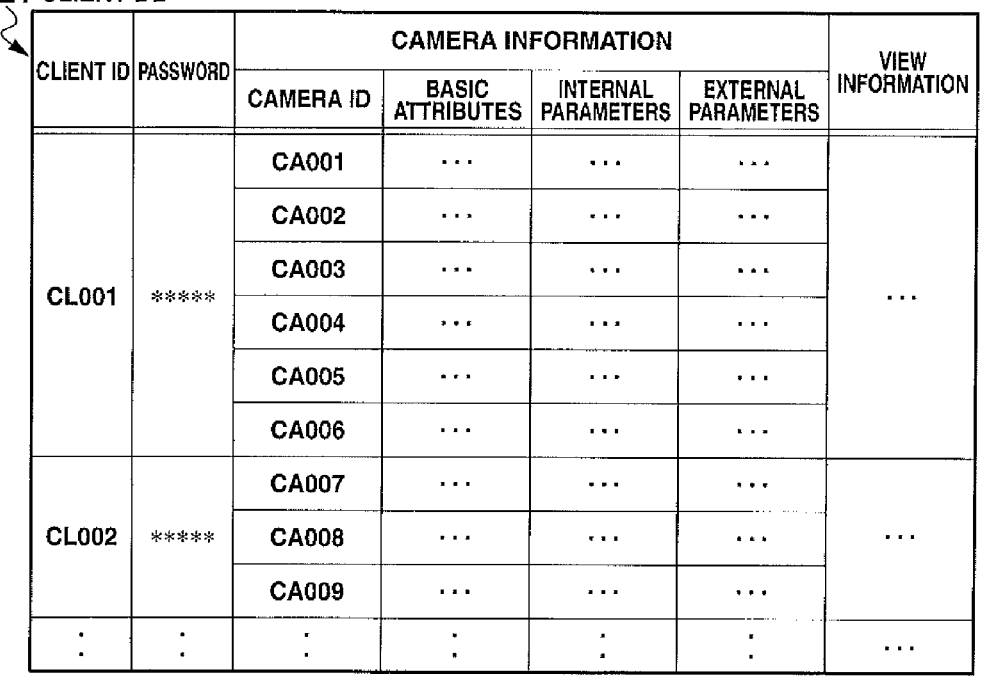
FIG. 5 is a drawing showing an example of the composition of a client DB.

The client DB 221 is a database where various types of information related to the clients 10 are stored. The various types of information are registered by a below-described client registration process. As shown in FIG. 5, the client DB 221 is composed of (1) client IDs identifying the clients 10, (2) passwords for authentication, (3) camera information and (4) view information, for each of the registered clients 10. The camera information is information that is composed of camera ID, basic attributes, internal parameters, external parameters and the like and that is registered for each camera 11 in the client 10.

The basic attributes show permanent attributes (properties) of cameras that are unlikely to be affected by aging or the like. Therefore, the cameras 11 of the same type comprise substantially the identical basic attributes. Accordingly, the basic attributes are for example the resolution, angle of view, focal length and the like of the camera 11.

The internal parameters are imaging parameters of the camera that change with time due to the effects of aging or the like. Accordingly, the internal parameters differ for each camera 11 even for cameras 11 of the same type. The internal parameters are for example focal length coefficient, image angle coefficient, lens distortion coefficient and the like.

The external parameters are imaging parameters showing positional relationships of the cameras 11 to the subject. The external parameters are composed of information showing the position coefficients (x,y,z) of the camera 11 as viewed from the subject, the angle in the up-and-down direction (tilt) of the camera 11, the angle in the left-to-right direction (pan), the rotational angle (roll) and so forth.

The view information is information defining which out of the cameras 11 in the client 10 have views for creating three-dimensional models. Specifically, the view information is information coordinating the camera IDs of the cameras 11 comprising the view. For example, consider the case where the cameras 11 are positioned as shown in FIG. 3 and a single view is comprised by neighboring cameras 11. In this case, view information would be information coordinating the camera 11A and the camera 11B, information coordinating the camera 11B and the camera 11C, information coordinating the camera 11C and the camera 11D, information coordinating the camera 11D and the camera 11E, and information coordinating the camera 11E and the camera 11F.

Returning to FIG. 4B, a three-dimensional model (polygon information) created at the request of the terminal apparatus 12 is stored in the three-dimensional model DB 222, linked to a polygon ID identifying the three-dimensional model and the camera IDs of the cameras 11 that capture the pair images that are the basis of that three-dimensional model creation.

Returning to FIG. 4A, the control unit 23 is provided with a CPU (Central Processing Unit) or the like, and controls the various parts of the server 20 by executing programs stored in the memory unit 22. In addition, the control unit 23, upon receiving a request from a client 10, executes a process to register the camera information and the like of that client 10 (client registration process), a process to create a three-dimensional model (three-dimensional model creation process) and a process to synthesize multiple three-dimensional models that were already created (three-dimensional model synthesis process). Details of these processes accomplished by the control unit 23 are described below.

Figure 6:
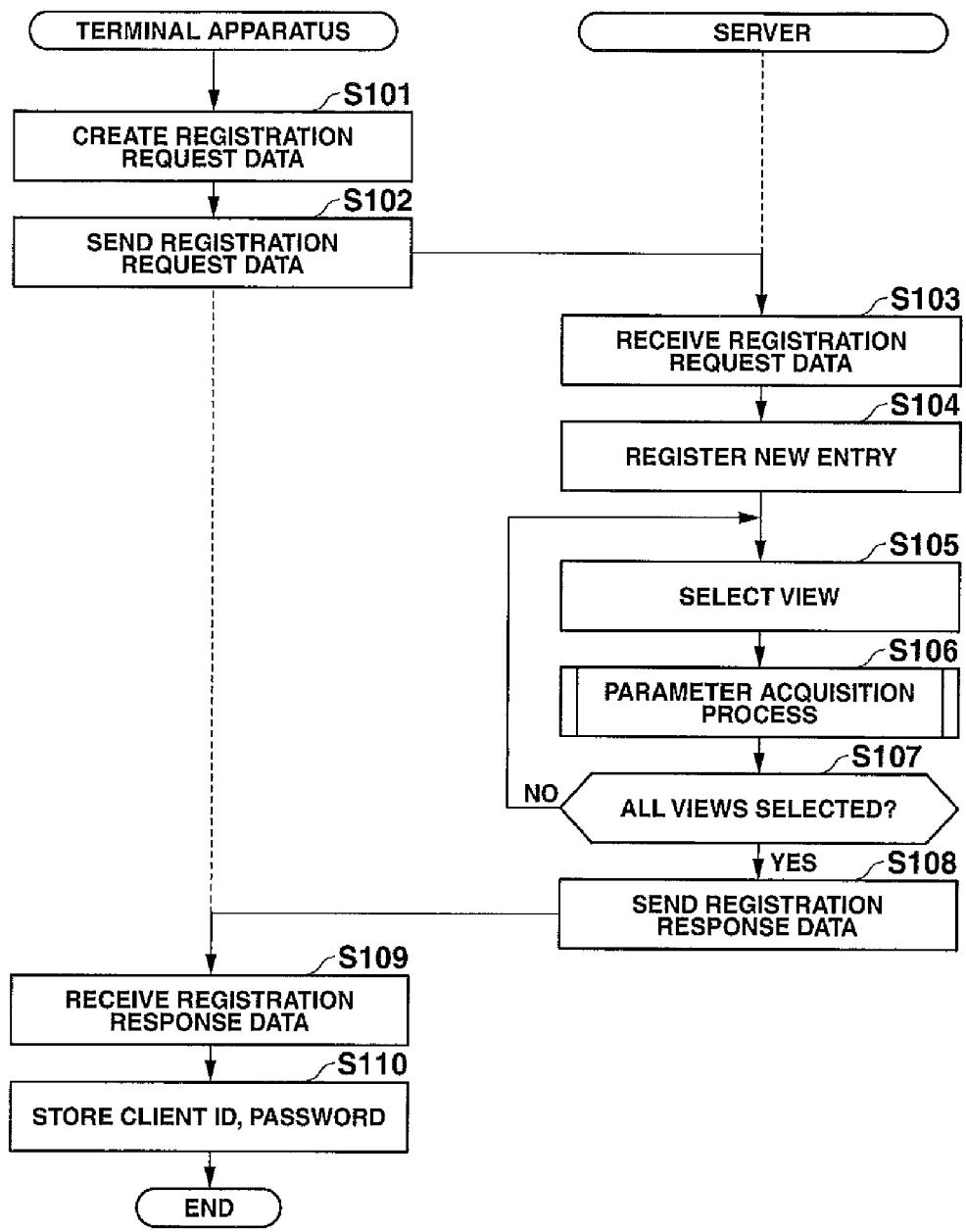
FIG. 6 is a flowchart used to explain the client registration process.

Next, operation of the three-dimensional model creation system 1 is explained
(Client Registration Process)
First, the client registration process will be explained.
The server 20 executes a process (client registration process) of registering in advance the client 10 and the camera information and the like of each camera 11 in that client 10 in order to create a three-dimensional model from images captured by the cameras 11 in the client 10. Details of this client registration process are described with reference to the flowchart in FIG. 6.

The user of the client 10 manipulates the input apparatus 14 and causes a client registration screen to be displayed on the display apparatus 13. The user then manipulates the input apparatus 14 and inputs the basic attributes of each camera 11 connected to the terminal apparatus 12 in that client registration screen. The basic attributes of a camera 11 may be obtained by referring to the manual of the camera 11. In addition, the user manipulates the input apparatus 14 and inputs view information indicating which cameras 11 together comprise a view. Furthermore, after completing input the user clicks a registration button displayed on the client registration screen. In response to this click operation, the control unit 124 creates registration request data containing this information that was input (step S101).

FIG. 7A shows the composition of registration request data. The registration request data is data containing a command identifier showing that the data is registration request data, the camera ID and basic attributes of each camera 11 and the view information.

Returning to FIG. 6, the control unit 124 sends the created registration request data to the server 20 via the Internet (step S102).

When the registration request data is received (step S103), the control unit 23 of the server 20 registers the camera ID, basic attributes and view information of the cameras 11 contained in that request data as a new entry in the client DB 221 (step S104). The control unit 23 of the server 20 appends a newly created client ID and authentication password to this registered new entry. In addition, at this time the values of the internal parameters and external parameters of the cameras 11 in the registered new entry are blanks.

Next, the control unit 23 selects one of the views indicated by the view information registered in step S104 (step S105). Furthermore, the control unit 23 accomplishes a process (parameter acquisition process) of acquiring the imaging parameters (internal parameters and external parameters) of the cameras 11 comprising the selected view (step S106).

Figure 9:
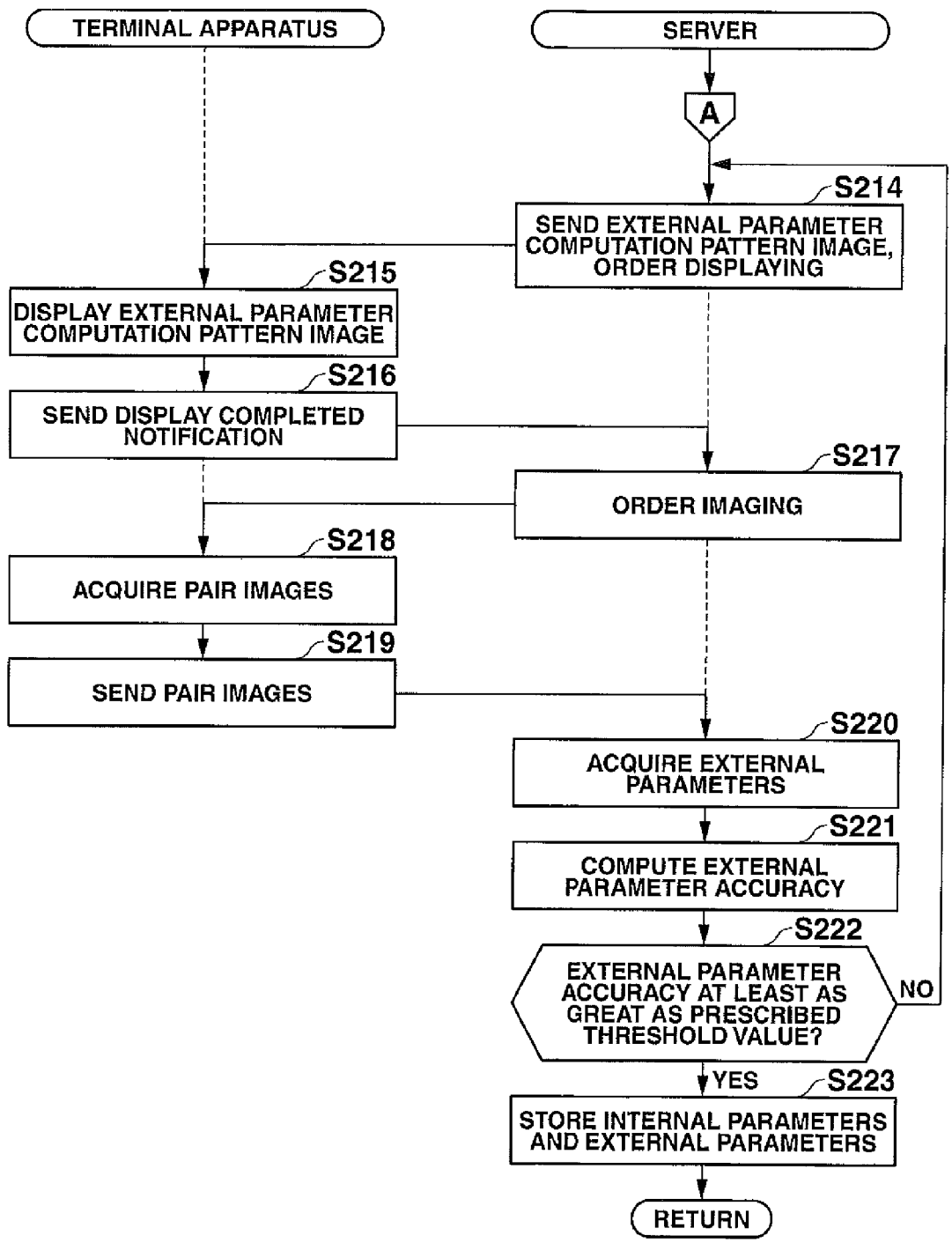
FIG. 9 is a flowchart used to explain the parameter acquisition process.

Details of the parameter acquisition process are explained with reference to the flowcharts in FIGS. 8 and 9.

First, the control unit 23 sends to the client 10 message information indicating to the user to move the display apparatus 13 to a position such that the cameras 11 comprising the view selected in step S105 can capture the entire screen of that display apparatus 13.

Furthermore, the control unit 124 of the terminal apparatus 12 of the client 10 causes message information received from the server 20 to be displayed on the display apparatus 13 (step S202). The user of the client 10 moves the display apparatus 13 to a position where the subject is established in accordance with this message, and moves the orientation of the display screen to a position where the cameras 11 that comprise the view selected in step S105 can capture images.

Figure 10:
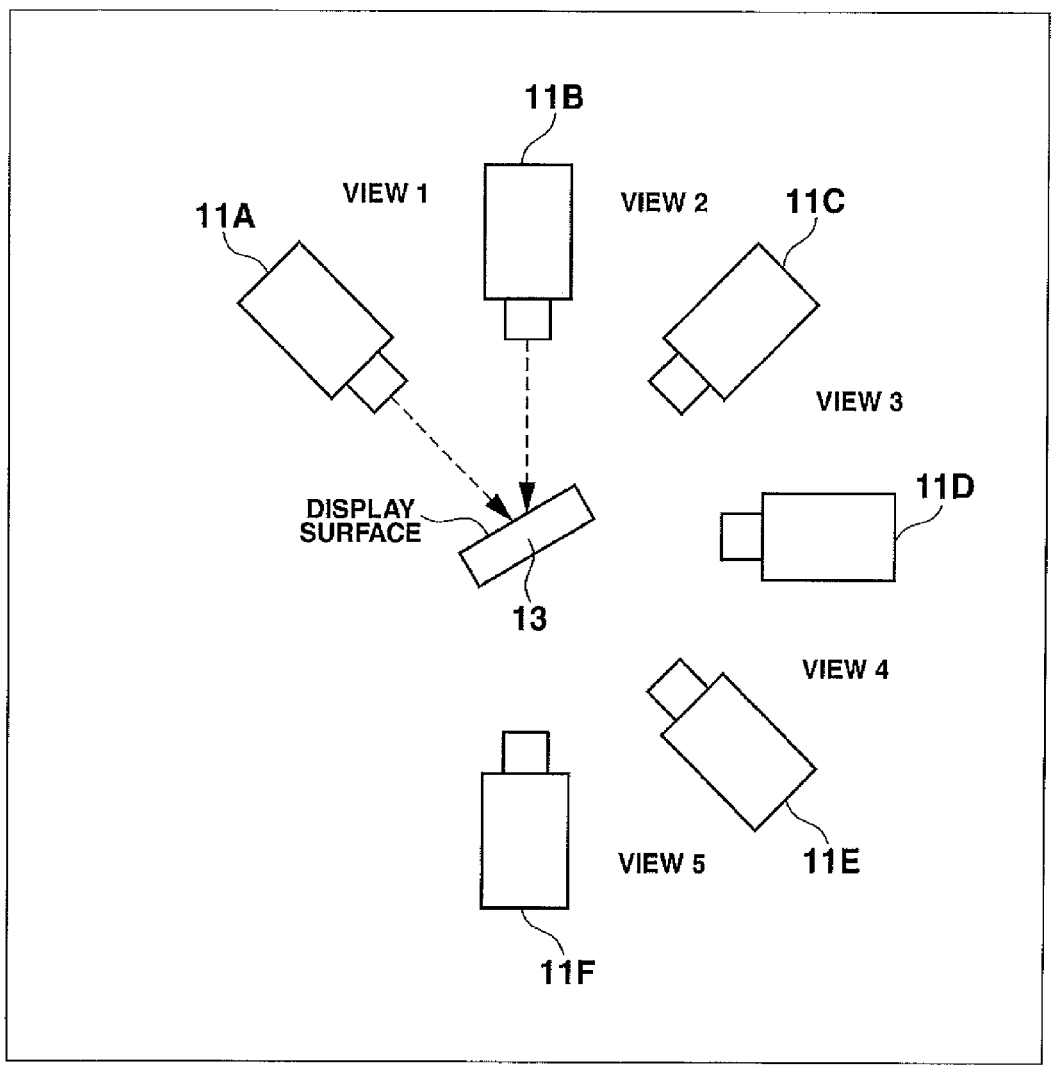
FIG. 10 is a drawing showing the positional relationship between the subject and the display apparatus.

For example, when the intent is to compute the imaging parameters of the cameras 11A and 11B comprising the view 1 shown in FIG. 3, the user of the client 10 causes the display apparatus 13 to move to the position shown in FIG. 10.

Returning to FIG. 8, when movement of the display apparatus 13 is completed, the user accomplishes operation input for communicating to the server 20 the fact that movement of the display apparatus 13 has been completed via the input apparatus 14. In response to this operation input, the control unit 124 of the terminal apparatus 12 sends a movement completed notification to the server 20 via the Internet (step S203).

Figure 11:
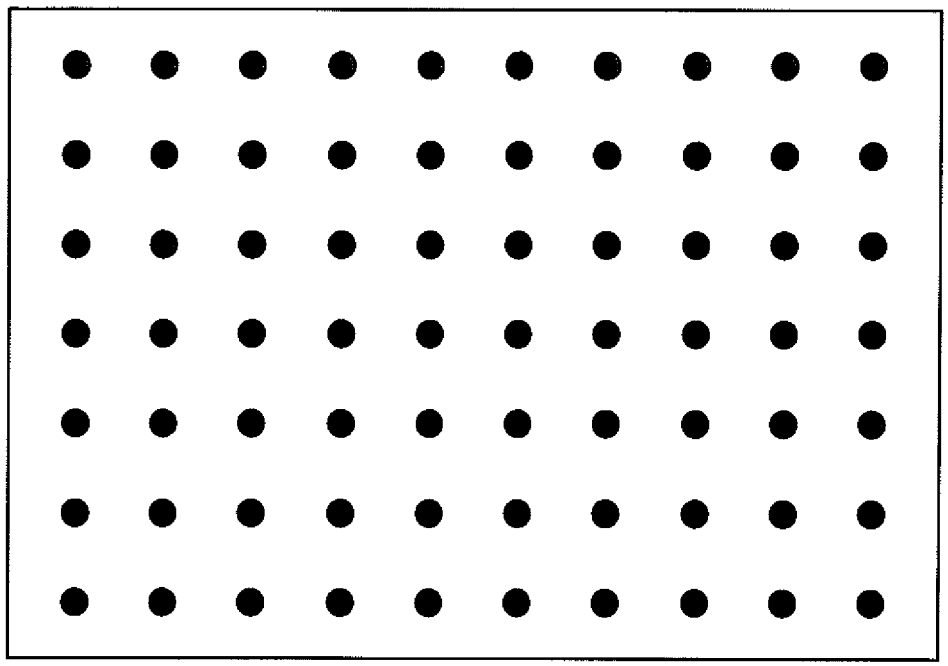
FIG. 11 is a drawing showing an example of the pattern image for parameter computation of the camera.

Upon receiving the movement completed notification, the control unit 23 of the server 20 sends pattern information for computing the internal parameters of the camera 11 to the terminal apparatus 12 of the client 10 via the Internet. In addition, the control unit 23 of the server 20 instructs the display apparatus 13 to display this pattern image (step S204). In response to this instruction, the control unit 124 of the terminal apparatus 12 causes the pattern image for computing the internal parameters that was received to be displayed on the display apparatus 13 (step S205). The pattern image for computing the internal parameters is an image in which individual points are positioned with equal spacing in a lattice pattern, as shown in FIG. 11.

Returning to FIG. 8, when the display of the pattern image for computing the internal parameters has been completed, the control unit 124 of the terminal apparatus 12 sends a display completed notification conveying the fact that the display of the pattern image has been completed to the server 20 via the Internet (step S206).

When the display completed notification is received, the control unit 23 of the server 20 instructs the terminal apparatus 12 to accomplish imaging by the various cameras 11 comprising the view selected in step S105 (step S207).

Upon receiving instructions from the server 20, the control unit 124 of the terminal apparatus 12 causes the cameras 11 that are the target of internal parameter computations to execute imaging and acquires pairs of captured images (pair images) (step S208). Furthermore, the control unit 124 sends the acquired pair images to the server 20 via the Internet (step S209).

When the pair images that capture the pattern image for computing the internal parameters are received, the control unit 23 of the server 20 determines whether or not that pattern image was captured in a suitable position (step S210). For example, a mark can be placed in the four corners of the pattern image in advance, and by the control unit 23 determining whether or not these marks are correctly positioned in the prescribed positions in the received pair images, a determination may be made as to whether or not the pattern image was captured in a suitable position.

When it is determined that the pattern image was not captured in a suitable position (step S210: No), the process moves to step S201 and the control unit 23 again instructs the user to move the display apparatus 13 and repeats the processes from there.

When it is determined that the pattern image was captured in a suitable position (step S210: Yes), the control unit 23 acquires the internal parameters of each camera 11 that captures the pair images through a commonly known method on the basis of the pattern image displayed in the pair images (step S211). For example, the control unit 23 may compute the parallax in characteristic points indicating the same points in each image of the pair images and may seek internal parameters from this parallax.

Here, there is a possibility that the accuracy of the internal parameters may be inadequate due to defects such as (1) the positioning of the pattern image relative to the camera 11 being inadequate, (2) dirt being present in part of the pattern image or (3) the extraction accuracy of the characteristic points being poor. Hence, the control unit 23 acquires the accuracy of the internal parameters acquired in step S211 through a commonly known method (step S212). Furthermore, the control unit 23 determines whether or not the acquired accuracy is at least a prescribed threshold value (step S213).

The control unit 23 may compute the accuracy of the internal parameters for example using the method noted in the document "A Flexible New Technique for Camera Calibration, Zhengyou Zhang, Dec. 2, 1998". More specifically, the control unit 23 may compute the accuracy of the parameters by computing the value of the below equation noted in that document (accuracy being greater the closer this value is to 0).

$$\sum_{i=1}^{N} \sum_{j=1}^{m} \|m_{ij} - m(A, k_1, k_2, R_i, t_i, M_j)\|$$

When the accuracy is not at least a threshold value (step S213: No), the process moves to step S201, the control unit 23 again instructs the user to move the display apparatus 23 and repeats the processes from there.

When the accuracy is at least a threshold value (step S213: Yes), the control unit 23 sends the pattern image for computing the external parameters of the camera 11 to the terminal apparatus 12 of the client 10 via the Internet and instructs the terminal apparatus 12 to cause that pattern image to be displayed on the display apparatus 13 (FIG. 9: step S214). In response to this instruction, the control unit 124 of the terminal apparatus 12 causes the pattern image for computing external parameters that was received to be displayed on the display apparatus 13 (step S215).

When the display of the pattern image for computing external parameters has been completed, the control unit 124 of the terminal apparatus 12 sends a display completed notification indicating that the display of the pattern image has been completed to the server 20 via the Internet (step S216).

When the display completed notification is received, the control unit 23 of the server 20 instructs the terminal apparatus 12 to accomplish imaging by the cameras 11 comprising the view selected in step S105 (step S217).

Upon receiving this instruction from the server 20, the control unit 124 of the terminal apparatus 12 causes imaging to be executed by the cameras 11 that are the subject of computing external parameters, and acquires the captured pair images (step S218). Furthermore, the control unit 124 sends the acquired pair images to the server 20 via the Internet (step S219).

Upon receiving the pair images that captured the pattern images for computing the external parameters, the control unit 23 of the server 20 acquires the external parameters of each camera 11 that captured the pair images by a commonly known method similar to the internal parameters on the basis of the pattern image displayed in those pair images (step S220).

Next, the control unit 23 acquires the accuracy of the external parameters found in step S220 by a commonly known method (step S221). Furthermore, the control unit 23 determines whether or not the accuracy acquired is at least a prescribed threshold value.

When the accuracy is not at least a threshold value (step S222: No), the process returns to step S214 and the control unit 23 again instructs the terminal apparatus 12 to display the pattern image for computing the external parameters and repeats the processes from there. At this time, the control unit 23 preferably causes a pattern image for computing external parameters differing from the prior process to be displayed on the terminal apparatus 12.

When the accuracy is at least a threshold value (step S222: Yes), the control unit 23 stores the internal parameters found in step S211 and the external parameters found in step S220 in the client DB 221 (step S223). With this, the parameter acquisition process is concluded.

Returning to FIG. 6, when the parameter acquisition process is concluded, the control unit 23 determines whether or not all of the views indicated by the view information registered in step S103 have been selected (step S107). When the determination is that there is an unselected view (step S107: No), the process returns to step S105 and the control unit 23 selects an unselected view and repeats the process of acquiring imaging parameters for two cameras 11 comprising that view.

When it is determined that all views have been selected (step S107: Yes), the control unit 23 sends registration response data such as that shown in FIG. 7B, including the client ID and password contained in the entry newly registered in step S104, to the terminal apparatus 12, which is the source of sending the client registration request (step S108).

Returning to FIG. 6, the control unit 124 of the terminal apparatus 12 upon receiving the registration response data (step S109) records in the memory unit 22 the client ID and password included in that registration response data (step S110). With this, the client registration process concludes.

As described above, through the registration process the camera information and view information for each camera 11 in the client 10 are registered (recorded) in the server 20 for each client 10. When registration concludes, the terminal apparatus 12 of the client 10 receives the client ID and password from the server 20. Furthermore, when the below processes (three-dimensional model creation process, three-dimensional model synthesis process) are accomplished, the terminal apparatus 12 can receive authentication by sending the client ID and password to the server 20.

(Three-Dimensional Model Creation Process)

The server 20 executes a three-dimensional model creation process that creates a three-dimensional model from the pair images sent from the client 10. Details of this three-dimensional model creation process are described with reference to the flowchart in FIG. 12, using as an example the case where a three-dimensional model is created from pair images composed of an image A captured by the camera 11A and an image B captured by the camera 11B.

First, the user of the client 10 manipulates the input apparatus 14 and causes a three-dimensional model creation screen to be displayed on the display apparatus 13. Furthermore, the user manipulates the input apparatus 14 to input the client ID and password and to select the images captured by the camera 11A and the camera 11B for the three-dimensional model that is to be created, from that three-dimensional model creation screen, and clicks a create button or the like displayed in that three-dimensional model creation screen. In response to this click operation, the control unit 124 creates three-dimensional model creation request data (step S301). The user may input the client ID and password received from the server 20 during the above-described registration process.

An example of the composition of the three-dimensional model creation request data is shown in FIG. 13A. The three-dimensional model creation request data is data including a command identifier indicating that this data is three-dimensional model creation request data, a client ID, a password, a request ID, the image data of the pair images (image A and image B) that are to create a 3D model, and the camera IDs of the cameras 11A and 11B that captured those images. The request ID is a unique ID the client 10 created in order to identify each request data of the three-dimensional model creation request data sent continuously from the same client 10.

Returning to FIG. 12, next the control unit 124 sends the created three-dimensional model creation request data to the server 20 via the Internet (step S302).

When the three-dimensional model creation request data is received (step S303), the control unit 23 of the server 20 determines whether or not the client 10 that is the source of sending the three-dimensional model creation request data is a client 10 that was registered in advance through the above-described registration process (step S304). Specifically, the control unit 23 determines whether or not the group consisting of the client ID and the password included in the three-dimensional model creation request data is stored in the client DB 221. When this group of the client ID and password included in the three-dimensional model creation request data has been stored, the control unit 23 may determine that this is a registered client 10.

When it is determined that this is not a registered client 10 (step S304: No), this is a request from an unauthenticated client 10 so the three-dimensional model creation process concludes with an error.

When it is determined that this is a registered client 10 (step S304: No), the control unit 23 executes the modeling process to create a three-dimensional model from the image data contained in the three-dimensional model creation request data (step S305).

Figure 14:
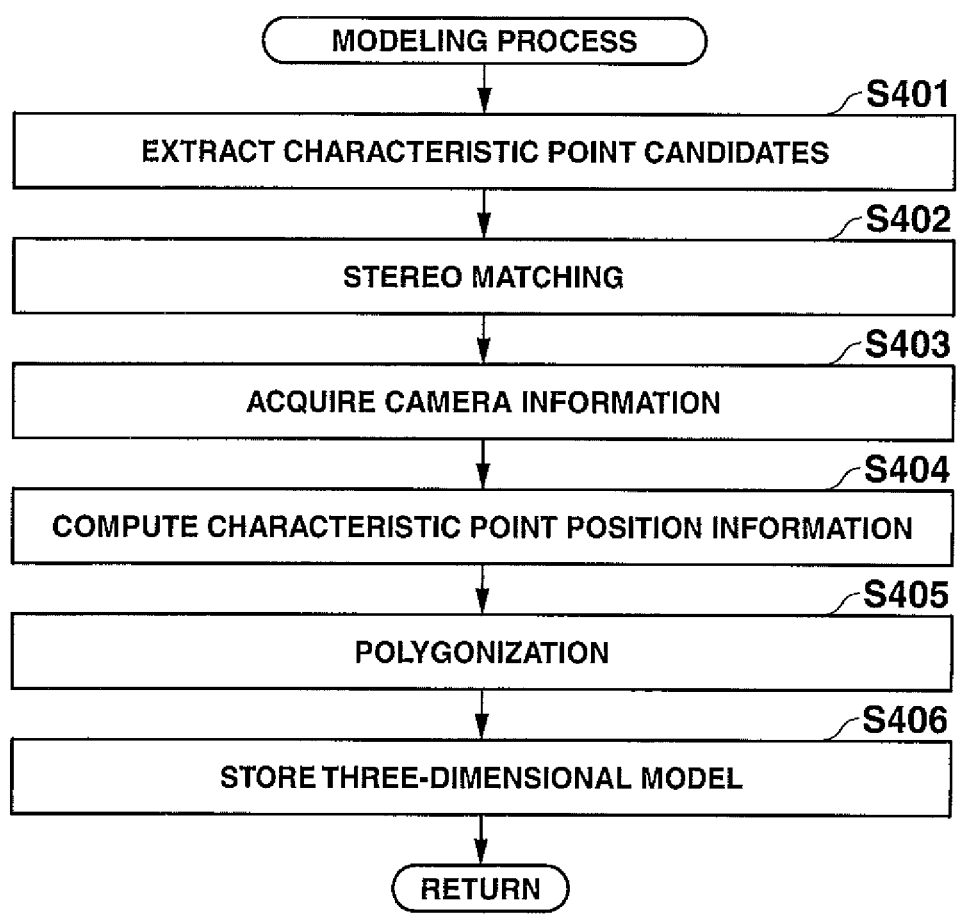
FIG. 14 is a flowchart used to explain the modeling process.

Here, the modeling process is explained in detail with reference to the flowchart shown in FIG. 14. The modeling process is a process for creating a three-dimensional model from one group of pair images. In other words, the modeling process can be thought of as a process for creating a three-dimensional model as seen from one view.

First, the control unit 23 extracts candidates for characteristic points (step S401). For example, the control unit 23 accomplishes corner detection on the image A. In corner detection, a point whose corner characteristic amount such as Harris or the like is at least a prescribed threshold value and is the maximum within a prescribed radius is selected as the corner point. Accordingly, a point with characteristics relative to other points, such as the tip of the subject or the like, is extracted as a characteristic point.

Next, the control unit 23 executes stereo matching and searches from image B the points (corresponding points) corresponding to the characteristic points of image A (step S402). Specifically, the control unit 23 sets as corresponding points those whose similarity through template matching is at least a threshold value and is a maximum (or whose difference is no greater than a threshold value and is a minimum). In template matching, various commonly known methods can be used, for example sum of absolute differences (SAD), sum of squared differences (SSD), normalized cross correlation (NCC or ZNCC), directional symbol correlation or the like.

Next, the control unit 23 searches the client DB 221 using the camera IDs of the cameras 11A and 11B included in the three-dimensional model creation request data as a key, and acquires the camera information of the cameras 11A and 11B that respectively captured the pair images (image A and image B).

Next, the control unit 23 computes the positional information of the characteristic points (three-dimensional position coordinates) on the basis of the camera information acquired in step S403 and the parallax information on the corresponding points detected in step S402 (step S404). The created position information of the characteristic points is stored for example in the memory unit 22.

Next, the control unit 23 executes Delaunay triangulation on the basis of the position information of the characteristic points computed in step S404, executes polygonization and creates a three-dimensional model (polygon information) (step S405).

Furthermore, the control unit 23 appends a new polygon ID to the three-dimensional model (polygon information) created in step S405, links this with the camera IDs of the cameras 11A and 11B that created the image A and image B that were the basis for creation of that three-dimensional model, and stores such in the three-dimensional model DB 222 (step S406). With this, the modeling process concludes.

Returning to FIG. 12, when the modeling process concludes, the control unit 23 creates three-dimensional model creation response data as a response to the three-dimensional model creation request data (step S306).

FIG. 13B shows the composition of the three-dimensional model creation response data. The three-dimensional model creation response data is data including a command identifier indicating that this data is three-dimensional model creation response data, a response ID, the three-dimensional model created by the modeling process (step S305), and the polygon ID. The response ID is an ID appended in order to identify which request data from the client 10 this data is in response to, when three-dimensional model creation request data is received continuously from the same client 10. The response ID may be the same as the request ID.

Returning to FIG. 12, next the control unit 23 sends the created three-dimensional model creation response data to the terminal apparatus 12 of the client 10 that is the source of sending the three-dimensional model creation request data (step S307).

When the three-dimensional model creation response data is received (step S308), the control unit 124 of the terminal apparatus 12 stores this in the memory unit 123, linking the polygon ID and the three-dimensional model contained in the response data. Furthermore, the control unit 124 causes the stored three-dimensional model to be displayed on the display apparatus 13 (step S310). With this, the three-dimensional model process concludes.

(Three-Dimensional Model Synthesis Process)

Figure 15:
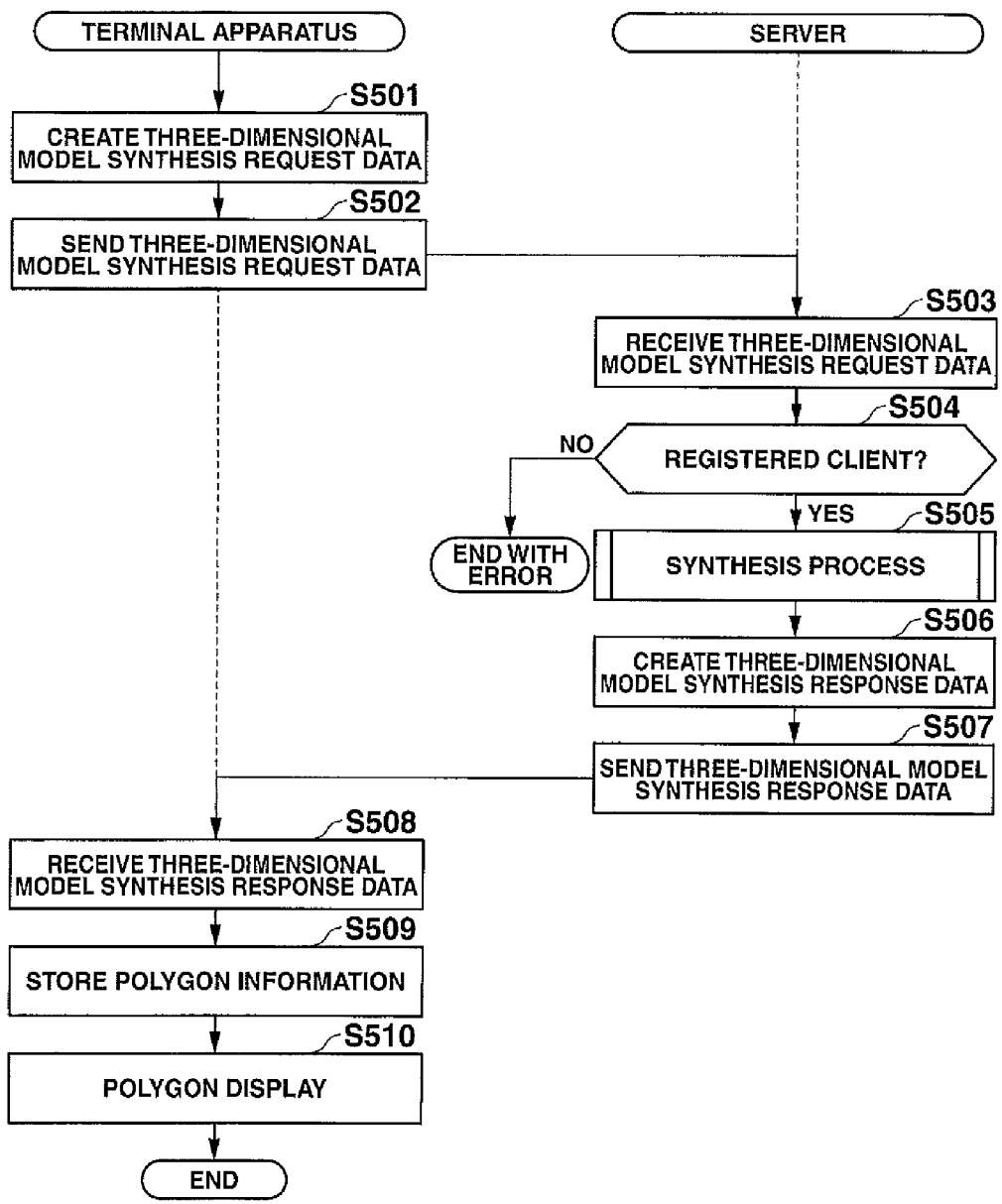
FIG. 15 is a flowchart used to explain the three-dimensional model synthesis process.

Next, the three-dimensional model synthesis process for synthesizing multiple three-dimensional models created by the above-described three-dimensional model creation process to create a more accurate three-dimensional model will be described with reference to the flowchart in FIG. 15.

First, the user of the client 10 manipulates the input apparatus 14 and causes a three-dimensional model synthesis screen to be displayed on the display apparatus 13. Furthermore, the user manipulates the input apparatus 14 and from this three-dimensional model synthesis screen accomplishes inputting of the client ID and password and inputting of the polygon IDs of the multiple three-dimensional models (polygon information) to be synthesized, and clicks a synthesis button displayed on that three-dimensional model synthesis screen. In response to this click operation, the control unit 124 creates three-dimensional model synthesis request data (step S501). The user may input the client ID and password received from the server 20 in the above-described registration process. In addition, the user may input the polygon ID received from the server in the above-described three-dimensional model creation process or a past three-dimensional model synthesis process.

In addition, the control unit 124 may store the three-dimensional model acquired by a past three-dimensional model creation process or the three-dimensional model synthesis process along with that polygon ID in the memory unit 123 for each view that was the basis of creation. Furthermore, the control unit 124 causes a summary of the three-dimensional models of each view to be displayed on the display apparatus 13, and may acquire the IDs of the three-dimensional models to be synthesized by causing the user to select the three-dimensional models to be synthesized from among these.

An example of the composition of the three-dimensional model synthesis request data is shown in FIG. 16A. The three-dimensional model synthesis request data is data that includes a command identifier indicating that this data is three-dimensional model creation request data, a client ID, a password, a request ID and multiple polygon IDs specifying the three-dimensional models to be synthesized. The request ID is a unique ID which the client 10 created in order to identify each request data of the three-dimensional model synthesis request data sent continuously from the same client 10.

Returning to FIG. 15, next the control unit 124 sends the created three-dimensional model synthesis request data to the server 20 via the Internet (step S502).

When the three-dimensional model synthesis request data is received (step S503), the control unit 23 of the server 20 determines whether or not the client 10 that is the source of sending the three-dimensional model synthesis request data is a client 10 that was registered in advance through the above-described registration process (step S504).

When it is determined that this is not a registered client 10 (step S504: No), this is a request from an unauthenticated client 10 so the three-dimensional model creation process is concluded with an error.

Figure 17:
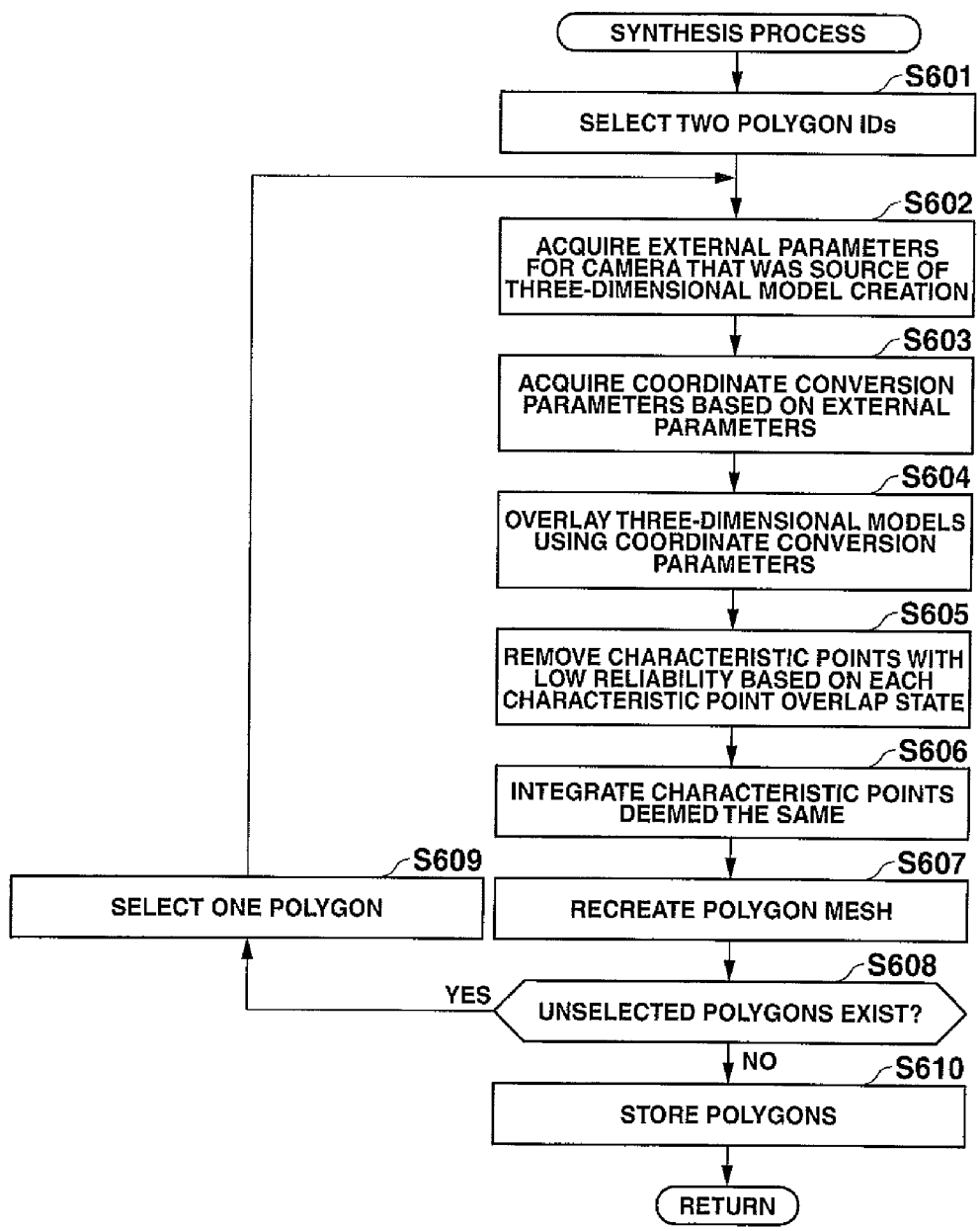
FIG. 17 is a flowchart used to explain the synthesis process.

When it is determined that this is a registered client 10 (step S504: Yes), the control unit 23 executes the synthesis process (step S505). Details of the synthesis process are explained with reference to the flowchart shown in FIG. 17.

First, the control unit 23 selects two of the multiple polygon IDs contained in the three-dimensional model creation request data (step S601). Here, the explanation below assumes that the two polygon IDs "p1" and "p2" were selected.

Furthermore, the control unit 23 acquires the external parameters of the cameras 11 that captured the pair images that were the source of creating the polygon information (three-dimensional model) indicated by those polygon IDs, for the two selected polygon IDs (step S602). Specifically, the control unit 23 searches the three-dimensional model DB 222 using the selected polygon IDs as keys and acquires camera IDs. Furthermore, the control unit 23 may acquire the external parameters of the cameras 11 corresponding to the acquired camera IDs from the client DB 221.

Next, the control unit 23 acquires coordinate conversion parameters for converting the coordinates of the three-dimensional model indicated by one of the polygon IDs p1 selected in step S601 into the coordinates of the three-dimensional model indicated by the other selected polygon ID p2, on the basis of the acquired external parameters (step S603).

Specifically, this process is a process for finding a rotation matrix R and a translation vector t satisfying equation (1). Here, X indicates the coordinates of the three-dimensional model indicated by the polygon ID p1 and X' indicates the coordinates of the three-dimensional model indicated by the polygon ID p2.

$$X = RX' + t \qquad (1)$$

As described above, the external parameters are information (coordinates, tilt, pan, roll) showing the position of the cameras 11 as viewed from the subject. Accordingly, the control unit 23 may compute the coordinate conversion parameters of the three-dimensional models of the subject by using a commonly known coordinate conversion method on the basis of those external parameters the three-dimensional models are created from the images of subject captured by the camera pair having those external parameters.

Next, the control unit 23 overlays the three-dimensional model specified by the polygon ID p1 and the three-dimensional model specified by the polygon ID p2 by using the acquired coordinate conversion parameters (step S604).

Next, the control unit 23 removes characteristic points with low reliability from the overlay condition of the characteristic points of the three-dimensional model specified by the polygon ID p1 and the characteristic points of the three-dimensional model specified by the polygon ID p2 (step S605). For example, the control unit 23 computes the Mahalanobis distance of noteworthy characteristic points of a given three-dimensional model from the distribution of the closest characteristic points of the other three-dimensional model, and when this Mahalanobis distance is at least as great as a prescribed value, determines that the reliability of the noteworthy characteristic points is low. It is also fine if characteristic points whose distance from the noteworthy characteristic points is at least a prescribed value are not included in the closest characteristic points. In addition, when the number of closest characteristic points is small, this may be viewed as the reliability being low. The process of removing characteristic points is executed after determining whether or not to remove regarding each of all characteristic points.

Next, the control unit 23 integrates characteristic points that are viewed as the same (step S606). For example, characteristic points within a prescribed distance are treated as belonging to a group all expressing the same characteristic point, and the centroid of these characteristic points is made a new characteristic point.

Next, the control unit 23 reconstructs the polygon mesh (step S607). In other words, a three-dimensional model (polygon information) is created on the basis of the new characteristic points found in step S606.

Next, the control unit 23 determines whether or not there are unselected (in other words, unsynthesized) items among the multiple polygon IDs included in the three-dimensional model creation request data (step S608).

When it is determined that unselected polygon IDs exist (step S608: Yes), the control unit 23 selects one of those polygon IDs (step S609). Furthermore, the process returns to step S602 and the control unit 23 similarly acquires coordinate conversion parameters between the three-dimensional model indicated by the polygon ID selected in step S609 and the three-dimensional model reconstructed in step S607, overlays both three-dimensional models and repeats the process of reconstructing the polygon.

When it is determined that no unselected polygon ID exists (step S608: No), the three-dimensional model indicated by the polygon IDs included in the three-dimensional model creation request data have all been synthesized. Accordingly, the control unit 23 appends a new polygon ID to the three-dimensional model (polygon information) reconstructed in step S607 and registers this in the three-dimensional model DB 222 (step S610). With this, the synthesis process concludes.

Returning to FIG. 15, when the synthesis process concludes, the control unit 23 creates three-dimensional model synthesis response data as a response to the three-dimensional model synthesis request data (step S506).

FIG. 16B shows the composition of the three-dimensional model synthesis response data. The three-dimensional model synthesis response data is data including a command identifier indicating that this data is three-dimensional model synthesis response data, a response ID, the three-dimensional model created (reconstructed) by the synthesis process (step S505), and the polygon ID of the three-dimensional model. The response ID is an ID appended in order to identify which request data from the client 10 this data is in response to, when three-dimensional model synthesis request data is received continuously from the same client 10. The response ID may be the same as the request ID.

Returning to FIG. 15, next the control unit 23 sends the created three-dimensional model synthesis response data to the terminal apparatus 12 of the client 10 that is the source of sending the three-dimensional model synthesis request data (step S507).

When the three-dimensional model synthesis response data is received (step S508), the control unit 124 of the terminal apparatus 12 stores this in the memory unit 123, linking the polygon ID and the polygon information contained in the three-dimensional model synthesis response data (step S509). Furthermore, the control unit 124 causes the stored three-dimensional model to be displayed on the display apparatus 13 (step S510). With this, the three-dimensional model synthesis process concludes.

In this manner, with this three-dimensional model synthesis process multiple three-dimensional models are created, thereby suppressing loss of shape information and enabling highly accurate three-dimensional modeling.

With the three-dimensional model creation system 1 according to this embodiment of the present invention, the camera information and view information for the cameras with which each client 10 is provided are stored in the server 20 in advance for each client 10. Furthermore, each client 10, when creating three-dimensional models from captured pair images, sends those pair images to the server 20. The server 20 creates a three-dimensional model on the basis of the received pair images and camera information stored in advance. Accordingly, the server 20 acts in place of a three-dimensional model creation process requiring a massive computational process, so the terminal apparatus 12 within the client 10 can be comprised of a relatively inexpensive CPU and the like. In addition, the system as a whole can create three-dimensional models from captured images at relatively low cost.

The present invention is not limited to that disclosed in the above embodiments.

For example, the present invention can also be applied to a composition in which the control unit 124 of the terminal apparatus 12 in the client 10 causes the subject to be captured on each camera 11 with a prescribed frame period (for example, 1/30 of a second) and streams the captured images to the server 20. In this case, the control unit 23 of the server 20 successively stores the continuously received images in the memory unit 22, linking the camera ID of the camera 11 that captured that image and the frame number that uniquely identifies each image continuously received. Furthermore, in the three-dimensional model creation process, the user of the terminal apparatus 12 of the client 10 may create three-dimensional model creation request data such as that shown in FIG. 13C specifying the images for which a three-dimensional model should be created using the camera ID and frame number, and may cause the server 20 to execute three-dimensional model creation.

In this manner, it is possible to shrink the size of the three-dimensional model creation request data, so it is possible to shorten the transfer time of the three-dimensional model creation request data to the server 20.

In addition, in the three-dimensional model creation process, image data the terminal apparatus 12 sends including the three-dimensional model creation request data may be image data that is a degradation of images captured by the cameras (for example, the number of pixels is reduced). In this case, the server 20 creates the three-dimensional model from the degraded image data and sends this to the terminal apparatus 12. The terminal apparatus 12 attaches the image data prior to degradation as texture to the received three-dimensional model and causes the attached three-dimensional model to be displayed on the display apparatus 13.

In this manner, the terminal apparatus 12 can shorten the image data transfer time. Furthermore, because an attached three-dimensional model in which non-degraded images are attached as texture to the three-dimensional model created from degraded images is displayed, it is possible to display a high-quality three-dimensional model.

In addition, for example by applying operating programs stipulating operations of the server 20 according to the present invention to an existing personal computer or information terminal equipment, it is possible to cause this personal computer or the like to function as the server 20 according to the present invention.

In addition, this kind of program distribution method is arbitrary. For example, the programs may be stored and distributed on a CD-ROM (Compact Disk Read-Only Memory), a DVD (Digital Versatile Disk), a MO (Magneto Optical Disk), a memory card or some other computer-readable storage medium. In addition, the programs may also be distributed via a communications network such as the Internet.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. An imaging parameter acquisition apparatus connected via a network to a client system equipped with a display apparatus and imaging apparatuses, the imaging parameter acquisition apparatus comprising:
   a movement instruction unit that sends a moving instruction message to the client system, the moving instruction message instructing to move the display apparatus so that each of the imaging apparatuses, which define lines of sight for creating a three-dimensional model, can shoot a screen of the display apparatus;
   a pattern image display instruction unit that sends a display instruction message to the client system to which the moving instruction message is sent, the display instruction message instructing the display apparatus to display a pattern image for imaging parameter calculation;
   an imaging instruction unit that sends an imaging instruction message to the client system to which the display instruction message is sent, the imaging instruction message instructing the imaging apparatuses to shoot the screen of the display apparatus;
   an image acquisition unit that acquires images which are shot by the imaging apparatuses in response to the imaging instruction message;
   an imaging parameter acquisition unit that acquires imaging parameters of each of the imaging apparatuses based on the images acquired by the image acquisition unit; and
   a memory unit that stores the imaging parameters acquired by the imaging parameter acquisition unit,
   wherein the memory unit stores, in association with each of client systems connected via the network, each of the imaging parameters of the imaging apparatuses included in each of the client systems, the imaging parameters being acquired by the imaging parameter acquisition unit.

2. The imaging parameter acquisition apparatus according to claim 1, further comprising an imaging position determination unit that determines whether or not an imaging position of each of the imaging apparatuses is suitable, based on position and size of the pattern image in each of the images acquired by the image acquisition unit;
   wherein the movement instruction unit resends the moving instruction message to the client system when the imaging position determination unit determines that the imaging position is not suitable.

3. The imaging parameter acquisition apparatus according to claim 1, further comprising a parameter accuracy calculation unit that calculates an accuracy of the imaging parameters acquired by the imaging parameter acquisition unit;
   wherein the movement instruction unit resends the moving instruction message to the client system when the accuracy of the imaging parameters calculated by the parameter accuracy calculation unit is less than a prescribed threshold value.

4. The imaging parameter acquisition apparatus according to claim 1, further comprising a parameter accuracy calculation unit that calculates an accuracy of the imaging parameters acquired by the imaging parameter acquisition unit;
   wherein the pattern image display instruction unit sends the display instruction message to the client system, the display instruction message instructing the display apparatus to display a pattern image different from the previously displayed pattern image, when the accuracy of the imaging parameters calculated by the parameter accuracy calculation unit is less than a prescribed threshold value.

5. The imaging parameter acquisition apparatus according to claim 1, wherein the imaging parameter acquisition unit acquires a focal length coefficient, an image angle coefficient and a lens distortion coefficient as imaging parameters of each of the imaging apparatuses.

6. An imaging parameter acquisition method using a computer connected via a network to a client system equipped with a display apparatus and imaging apparatuses, the method comprising:
   a movement instruction step of sending a moving instruction message to the client system, the moving instruction message instructing to move the display apparatus so that each of the imaging apparatuses, which define lines of sight for creating a three-dimensional model, can shoot a screen of the display apparatus;
   a pattern image display instruction step of sending a display instruction message to the client system to which the moving instruction message is sent, the display instruction message instructing the display apparatus to display a pattern image for imaging parameter calculation;
   an imaging instruction step of sending an imaging instruction message to the client system to which the display instruction message is sent, the imaging instruction message instructing the imaging apparatuses to shoot the screen of the display apparatus;

an image acquisition step of acquiring images which are shot by the imaging apparatuses in response to the imaging instruction message;

an imaging parameter acquisition step of acquiring imaging parameters of each of the imaging apparatuses based on the images acquired at the image acquisition step; and a memory control step of controlling a memory apparatus to store, in association with each of client systems connected via the network, each of the imaging parameters of the imaging apparatuses included in each of the client systems, the imaging parameters being acquired at the imaging parameter acquisition step.

7. A non-transitory computer-readable storage medium having stored thereon a program executable by a computer that is connected via a network to a client system equipped with a display apparatus and imaging apparatuses, the program causing the computer to function as units comprising:

a movement instruction unit that sends a moving instruction message to the client system, the moving instruction message instructing to move the display apparatus so that each of the imaging apparatuses, which define lines of sight for creating a three-dimensional model, can shoot a screen of the display apparatus;

a pattern image display instruction unit that sends a display instruction message to the client system to which the moving instruction message is sent, the display instruction message instructing the display apparatus to display a pattern image for imaging parameter calculation;

an imaging instruction unit that sends an imaging instruction message to the client system to which the display instruction message is sent, the imaging instruction message instructing the imaging apparatuses to shoot the screen of the display apparatus;

an image acquisition unit that acquires images which are shot by the imaging apparatuses in response to the imaging instruction message;

an imaging parameter acquisition unit that acquires imaging parameters of each of the imaging apparatuses based on the images acquired by the image acquisition unit; and a memory control unit that controls a memory apparatus to store, in association with each of client systems connected via the network, each of the imaging parameters of the imaging apparatuses included in each of the client systems, the imaging parameters being acquired by the imaging parameter acquisition unit.

* * * * *